May 16, 1961  W. E. FOLKERTS  2,984,121
VEHICLE STEERING MECHANISM
Filed Nov. 23, 1959
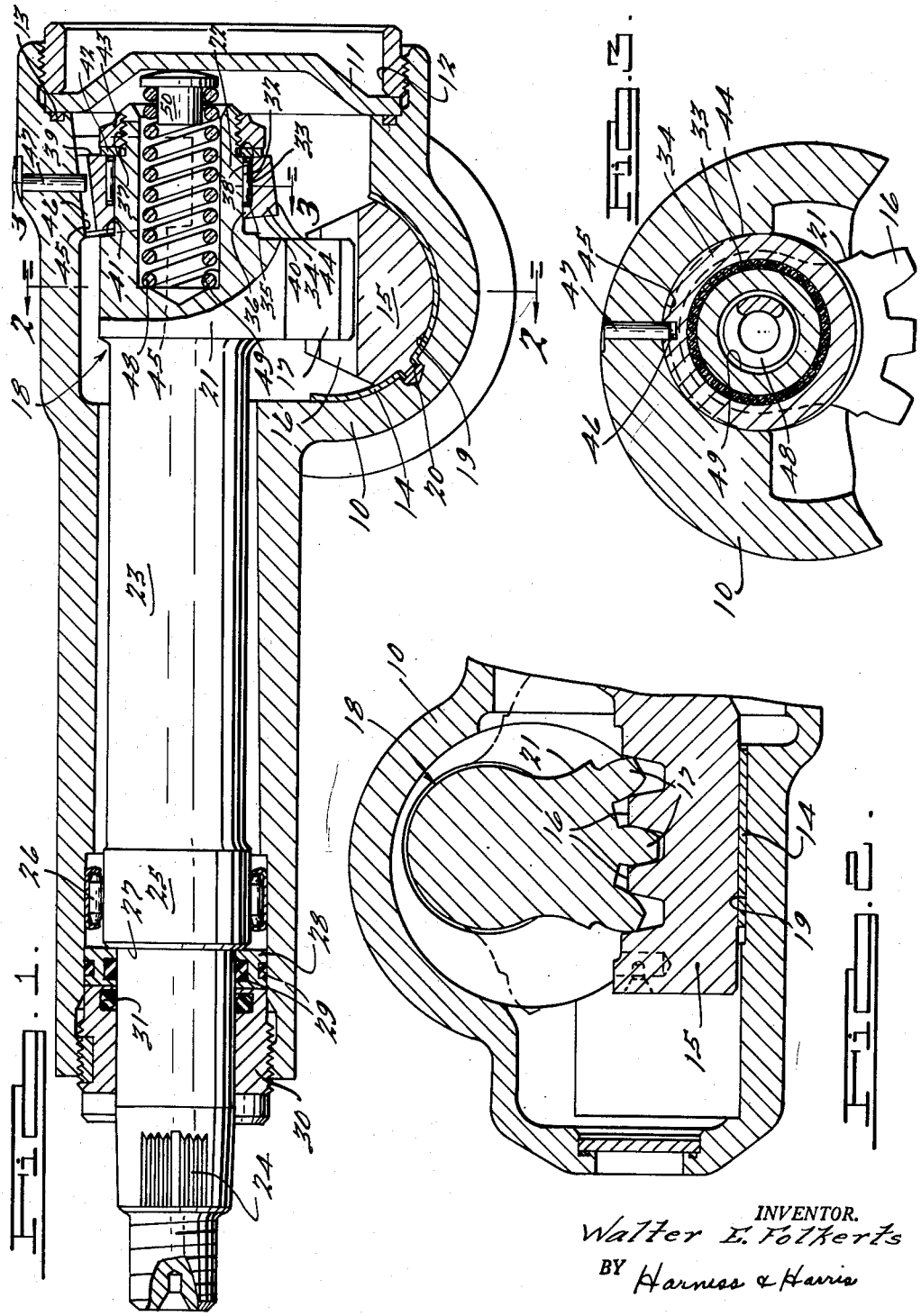
INVENTOR.
Walter E. Folkerts
BY Harness & Harris
ATTORNEYS.

United States Patent Office 2,984,121
Patented May 16, 1961

2,984,121

VEHICLE STEERING MECHANISM

Walter E. Folkerts, Hazel Park, Mich., assignor to Chrysler Corporation, Highland Park, Mich., a corporation of Delaware Filed Nov. 23, 1959, Ser. No. 854,854

8 Claims. (Cl. 74—409)

This invention relates to vehicle steering mechanisms of the rack and sector gear type wherein a reciprocable gear rack meshing with a pivotal sector gear controls the vehicle dirigible wheels through a suitable linkage.

In such a construction it is important to eliminate play or backlash between the meshing gear teeth in order to achieve a suitable steering action, especially in the straight-ahead steering position. In the course of operation, wearing of the meshing gear teeth results in objectionable steering play, so that means for adjusting the engagement between the rack and sector gears are required. Heretofore it has been customary to utilize gear teeth tapered in the direction of the pivot axis of the sector gear and to adjust the sector gear axially to eliminate play or backlash in the gear connection. Such a structure introduces production limitations and in particular increases the cost of the mechanism.

It is accordingly an important object of the present invention to provide an improved steering mechanism of the above character including simplified and improved adjusting means for minimizing the play between the meshing gear teeth without recourse to tapered teeth.

Another object is to provide such a structure which is automatically self-compensating for wear between the meshing teeth, thereby to minimize play or backlash therebetween throughout the operating life of the structure.

Another object is to provide an improved bearing support for the sector gear adjustable axially of the latter to effect radial adjustment of the sector gear and thereby to adjust the play or backlash between the rack and sector gears.

Another object is to provide such a structure comprising a sector gear integral with oppositely directed axial rockshaft extensions, one extension being adapted to be connected with a steering linkage to actuate the latter upon pivoting of the sector gear and having a radial shoulder abutting a relatively fixed wear washer to limit axial movement of the sector gear in the direction toward the wear washer. The other rockshaft extension is journalled in bearing means having an outer nonrotatable collar supported by a housing for the gear mechanism. The outer surface of the collar is cylindrical about an axis oblique to the pivot axis of the sector gear and mates with a corresponding oblique surface of the housing, so that upon relative adjusting movement of the collar with respect to the housing, the sector gear will be cammed toward the gear rack to eliminate play therebetween. By virtue of the foregoing, a highly efficient steering gear mechanism is rendered feasible which is particularly simple and economical to construct and assemble.

In the above regard, the material of the wear washer is determined so that the latter will wear at a rate corresponding to the rate of wearing of the meshing gear teeth, thereby to enable the adjusting movement of the collar as required to minimize play between the meshing teeth.

Still another object is to provide means yieldingly urging the collar axially toward the wear washer so as to maintain said radial shoulder in snug abutment with the wear washer and automatically effect said adjusting movement to minimize play between the meshing gear teeth throughout the operating life of the mechanism.

Although the present invention is primarily concerned with a rockshaft type of steering mechanism wherein a sector gear on the rockshaft meshes with a gear rack, it will be apparent from the following that the rack and sector gears may be replaced by other types of gears, as for example conventional spur gears. Also it will be apparent that the bearing support and adjustment feature of the present invention will have applications in other than steering mechanisms.

Other objects of this invention will appear in the following description and appended claims, reference being had to the accompanying drawings forming a part of this specification wherein like reference characters designate corresponding parts in the several views.

Figure 1 is a sectional view taken longitudinally of the rockshaft of a vehicle steering gear.

Figure 2 is a fragmentary sectional view taken in the direction of the arrows substantially along the line 2—2 of Figure 1.

Figure 3 is a fragmentary sectional view taken in the direction of the arrows substantially along the line 3—3 of Figure 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, an embodiment of the present invention is illustrated by way of example comprising an outer housing 10 which is suitably secured to the vehicle chassis. A tubular portion of the housing 10 is shown which is closed at one end by a plate 11 secured in position by a nut 12. An annular seal 13 between the plate 11 and housing 10 prevents loss of lubricating fluid from the interior of the mechanism. Mounted for reciprocating sliding movement within housing 10 by means of a cylindrical bushing 14 is a gear rack 15 having upwardly directed teeth 16 intermeshing with the teeth 17 of a sector gear structure indicated generally by the numeral 18. The under surface of the rack 15 in Figure 1 is cylindrical in shape about an axis parallel to its directions of reciprocating movement and mates in bearing relationship with the bushing 14. The latter seats against a mating cylindrical surface 19 of the housing 10 and is provided with a tubular offset projection 20 which seats within a mating bore in the housing 10 to key the bushing 14 in relatively fixed position.

Reciprocation of the rack 15 is under the manual control of the vehicle operator and where desired may be employed with a conventional power actuated followup type servo mechanism to assist the manual control of the reciprocation of rack 15 during a steering operation. The structure thus far may be conventional and is accordingly not described in further detail.

The teeth 17 extend radially from the pivot axis of a sector gear 21 integral with the structure 18 and with oppositely directed axial rockshaft extensions 22 and 23. The left end of rockshaft extension 23 projects through tubular housing 10 and is provided with a splined end 24 adapted for attachment with the vehicle steering linkage. The extension 23 is also provided with a coaxial annular bearing surface 25 journalled in housing 10 by means of a needle bearing set 26 and which provides a radial shoulder 27 at its leftward edge. A wear washer 28 containing annular sealing means 29 to prevent loss of fluid from housing 10 is maintained in axially adjusted position against shoulder 27 by an annular nut 30 screwed into the left end of housing 10 around rockshaft extension 23. The nut 30 carries a conventional dirt seal 31 extending snugly around shaft 23.

Rockshaft extension 22 at the right of sector gear 21 is provided with a cylindrical outer bearing surface 32 coaxial with the pivot axis of sector gear 21. An annular set of needle bearings 33 around the surface 32 and extending axially of sector gear 21 are maintained in position by a non-rotatable collar 34 having an inner cylindrical bearing surface 35 coaxial with bearing surface 32 and also having an inwardly directed radial flange 36 arranged to prevent leftward movement of the needle bearings 33 with respect to collar 34. Immediately to the right of the needle bearings 32, the rockshaft extension 22 has a reduced diameter threaded portion 37 which provides a radial shoulder 38 in coplanar alignment with the right edge 39 of assembled collar 34 and normal to the pivot axis of sector gear 21.

The surface at the right edge 40 of collar 34 is formed at a slight wedge angle converging downwardly in Figure 1 with respect to the plane of surface 39 and is spaced from the juxtaposed shoulder 41 defining the sector gear 21. The plane of the surface of edge 40 is also perpendicular to the vertical plane of symmetry of sector gear 21. Abuting the coplanar surfaces 38 and 39 is a washer 42 which retains the needle bearings 33 in position and is in turn retained in place by a nut 43 screwed on the threaded portion 37 of rockshaft extension 22.

The outer surface of collar 34 is formed cylindrically about an axis perpendicular to the plane of surface 40 and obliquely intersecting the axis of rotation of sector gear 21. The upper portion of the outer cylindrical surface 44 is supported by a correspondingly oblique cylindrical surface 45 of the housing 10, such that upon axial movement of collar 34 the latter and sector gear 21 will be adjusted vertically with respect to gear rack 15. Thus upon leftward movement of collar 34, its outer surface 44 sliding along cylindrical housing surface 45 will cam sector gear 21 downwardly and take up any play or backlash existing in the gear connection between the meshing teeth 16 and 17. Collar 34 is maintained in rotational alignment with respect to housing 10 by means of a notch 46 formed axially in its upper surface and snugly confining the lower end of a retaining pin 47 secured within housing 10.

It is apparent that collar 34 may initially be formed to a right cylindrical shape which is then suitably faced at 39 obliquely to the axis of collar 34, which in turn is perpendicular to face 40. Collar 34 may then be bored perpendicularly to face 39 and finished to form flange 36 and bearing surface 35. The sector gear structure 18 with collar 34, washer 42, and nut 43 assembled thereon, may then be mounted within housing 10 with gear teeth 16 and 17 in proper mesh with a minimum of play or backlash. Wear washer 28 is then assembled and snugged against shoulder 27 by nut 30. The material of wear washer 28 is determined so that as subsequent wear between the intermeshing teeth 16 and 17 takes place during steering operation, washer 28 will wear at a corresponding rate to enable leftward adjusting movement of the sector gear structure 18 and collar 34 sufficiently to take up the play or lost motion between the intermeshing teeth resulting from the wear therebetween.

In order to provide for the automatic leftward adjustment of the sector gear structure 18 and collar 34 upon the wearing of the teeth 16 and 17 so as to minimize play therebetween throughout the operating life of the mechanism, the structure 18 is yieldingly urged leftward by a coil spring 48 seated against the base of an endwise opening bore 49 formed coaxially in the right end of extension 22. The right end of spring 48 is seated under compression against a retainer 50 which in turn abuts the end closure plate 11.

In regard to the automatic adjustment of the play between the intermeshing teeth 16 and 17, the material of wear washer 28 is determined in consideration of the material of shoulder 27 and the tension of spring 48 so that washer 28 will wear at a rate slightly faster than that required to minimize play between the intermeshing teeth 16 and 17. Thus after the intermeshing teeth 16 and 17 are initially assembled and adjusted, the tendency for washer 28 to wear enables the teeth 16 and 17 to wear into proper meshing engagement with each other, whereupon the sector gear structure 18 subject to the force of spring 48 will be adjustably shifted leftward and downward. As the more slowly wearing teeth 16 and 17 seat together for engagement in comparatively backlash-free engagement at all steering positions, the force of spring 48 urging the sector gear structure 18 leftward is resisted primarily by gear rack 15, so that excessive wearing of washer 28 is avoided. As the intermeshing teeth 16 and 17 tend to wear additionally, the resulting tendency for downward and leftward adjustment of sector gear 21 will increase the spring induced pressure of shoulder 27 against washer 28, causing the latter to wear correspondingly to enable the aforesaid adjustment.

It is accordingly apparent that an important function of washer 28 is to facilitate an initial adjustment of the interengagement between teeth 16 and 17 until the same properly seat together by mutual wearing. During the initial assembly of the mechanism, nut 30 is adjusted until the teeth 16 and 17 intermesh freely at all steering positions with a minimum of play or backlash therebetween at any specific steering position which might tend to bind because of production variation in the teeth from their preferred dimensions. Thereafter the teeth 16 and 17 are allowed to seat or mesh properly together by their aforesaid mutual wearing. Without washer 28, slight dimensional variations in the teeth 16 and 17 might enable leftward and downward adjustment of sector gear 21 at one steering position in excess of the adjusting movement required to eliminate play or backlash at other steering positions. In such an event the gear mechanism might be damaged upon being moved to other steering positions because of the shallow angle of convergence between the axes of gear 21 and collar 34. On the other hand, the aforesaid shallow angle of preferably less than 10° enables a comparatively light weight spring 48 to hold the sector gear structure 18 against rightward movement when the mechanism is subject to maximum steering loads.

I claim:

1. In a vehicle steering mechanism, a housing, a gear rack reciprocable in said housing, a pivotal sector gear meshing with said rack, bearing means for said sector gear having an outer cylindrical surface arranged about an axis oblique to the pivot axis of said sector gear and mating with a correspondingly oblique cylindrical surface of said housing to cam said sector gear toward said gear rack upon movement of said sector gear in one direction of its pivot axis, thereby to reduce the play between the meshing gear teeth of said rack and sector gear, and means for moving said sector gear in said direction.

2. In a vehicle steering mechanism, a housing, a gear rack reciprocable in said housing, a pivotal sector gear meshing with said rack, a wear washer mounted in said housing and engaging a radial shoulder of said sector gear, bearing means for said sector gear having an outer cylindrical surface arranged about an axis oblique to the pivot axis of said sector gear and mating with a correspondingly oblique cylindrical surface of said housing to cam said sector gear toward said gear rack upon movement of said sector gear in the direction of its pivot axis toward said wear washer, thereby to reduce the play between the meshing gear teeth of said rack and sector gear, and means yieldingly urging said sector gear in said direction, the material of said wear washer being determined with respect to the rate of wearing of said meshing teeth and the force of said means yieldingly urging the shoulder of said sector gear against said wear washer to wear the latter and shoulder at a rate effective to minimize undue play between said meshing teeth.

3. In a vehicle steering mechanism, a housing, a gear rack reciprocable in said housing, a pivotal sector gear meshing with said rack, a wear washer mounted in said housing and engaging a radial shoulder of said sector gear, bearing means for said sector gear having an outer cylindrical surface arranged about an axis oblique to the pivot axis of said sector gear and mating with a correspondingly oblique cylindrical surface of said housing to cam said sector gear toward said gear rack upon movement of said sector gear in the direction of its pivot axis toward said wear washer, thereby to reduce the play between the meshing gear teeth of said rack and sector gear, and means for moving said sector gear in said direction, the material of said wear washer being determined with respect to the rate of wear between said meshing teeth to effect a predetermined rate of wear between said washer and shoulder.

4. In a vehicle steering mechanism, a housing, a gear rack reciprocable in said housing, a sector gear meshing with said gear rack and having oppositely directed axial shaft extensions, bearing means for one of said extensions having an outer cylindrical surface arranged about an axis oblique to the pivot axis of said sector gear and mating with a correspondingly oblique cylindrical surface of said housing to cam said sector gear toward said gear rack upon axial movement of said sector gear in one direction, thereby to reduce the play between the meshing gear teeth of said rack and sector gear, and means for effecting said axial movement of said sector gear.

5. The combination according to claim 4 wherein an axial bore opens endwise in said other extension, and said means for effecting said axial movement of said sector gear in said direction toward said washer comprises a spring seated in said bore having one end fixed with respect to said housing and being under tension urging said sector gear in said direction.

6. In combination, a housing, a pair of gear means operably mounted in said housing and having intermeshing teeth, means for regulating the play between said intermeshing teeth comprising bearing means journalling one of said gear means for turning about an adjustable axis, said bearing means including a collar having a cylindrical inner surface coaxial with said adjustable axis and having a cylindrical outer surface arranged about an axis oblique to said adjustable axis and mating with a correspondingly oblique cylindrical surface of said housing to cam said one bearing means toward the other upon relative movement between said collar and housing longitudinally of said adjustable axis, and means for effecting said relative movement.

7. In combination, a housing, a pair of gear means operably mounted in said housing and having intermeshing teeth, means for regulating the play between said intermeshing teeth comprising bearing means journalling one of said gear means for turning about an adjustable axis, said bearing means including a collar carried by said one gear means and having a cylindrical outer surface arranged about an axis oblique to said adjustable axis and mating with a correspondingly oblique cylindrical surface of said housing to cam said one bearing means toward the other upon relative movement between said collar and housing longitudinally of said adjustable axis, and means yieldingly urging said movement in the direction tending to decrease the play between said intermeshing teeth.

8. In combination, a housing, a pair of gear means operably mounted in said housing and having intermeshing teeth, means for regulating the play between said intermeshing teeth comprising bearing means journalling one of said gear means for turning about an adjustable axis, said bearing means including a collar carried by said one gear means and having a cylindrical outer surface arranged about an axis oblique to said adjustable axis and mating with a correspondingly oblique cylindrical surface of said housing to cam said one bearing means toward the other upon relative movement between said collar and housing longitudinally of said adjustable axis, means yieldingly urging said movement in the direction tending to decrease the play between said intermeshing teeth, and a wear washer mounted in said housing and engaging a radial surface of one of the elements comprising said one gear means and said collar to limit said movement in said direction tending to decrease the play between said intermeshing teeth, the material of said wear washer being determined with respect to the rate of wear between said intermeshing teeth to effect a predetermined rate of wear between said wear washer and said radial surface to enable said movement in the last-named direction as required by wear between said intermeshing teeth to minimize play therebetween.

References Cited in the file of this patent

UNITED STATES PATENTS

| | | |
|---|---|---|
| 1,974,781 | Marles | Sept. 25, 1934 |
| 1,995,789 | Walkoff | Mar. 26, 1935 |
| 2,573,628 | Duyn | Oct. 30, 1951 |
| 2,936,643 | Smith et al. | May 17, 1960 |

FOREIGN PATENTS

| | | |
|---|---|---|
| 672,274 | Great Britain | May 21, 1952 |